(12) United States Patent
Ovalekar et al.

(10) Patent No.: US 6,567,466 B1
(45) Date of Patent: May 20, 2003

(54) METHOD AND APPARATUS FOR DETERMINING THE DATA RATE OF A RECEIVED SIGNAL IN A VARIABLE DATA RATE ORTHOGONAL SPREAD SPECTRUM COMMUNICATION SYSTEM

(75) Inventors: Sameer V. Ovalekar, Allentown, PA (US); Xiao-An Wang, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/250,744

(22) Filed: Feb. 16, 1999

(51) Int. Cl.[7] .............................................. H04B 17/00
(52) U.S. Cl. ........................ 375/225; 375/341; 370/543
(58) Field of Search ................................ 375/225, 147, 375/340, 341, 342, 260, 262; 370/252, 468, 543, 545

(56) References Cited

U.S. PATENT DOCUMENTS

| | | | | |
|---|---|---|---|---|
| 5,566,206 A | * | 10/1996 | Butler et al. | 375/225 |
| 5,638,408 A | * | 6/1997 | Takaki | 375/262 |
| 5,671,255 A | * | 9/1997 | Wang et al. | 375/341 |
| 5,751,725 A | * | 5/1998 | Chen | 714/708 |
| 5,757,850 A | * | 5/1998 | Takaki | 375/225 |
| 5,771,226 A | * | 6/1998 | Kaku | 370/232 |
| 5,832,001 A | * | 11/1998 | Choi | 714/790 |
| 5,883,923 A | * | 3/1999 | Shimazaki | 375/225 |
| 6,111,912 A | * | 8/2000 | Cohen et al. | 375/225 |
| 6,424,631 B1 | * | 7/2002 | Czaja et al. | 370/252 |

OTHER PUBLICATIONS

E. Cohen and H.–L. Lou, "Multi–Rate Detection for the IS–95A CDMA Forward Traffic Channel Using the 13kbs Speach Coder," Proc. IEEE Int'l Communications Conf. (1996).

E. Cohen and H.–L. Lou, "Multi–Rate Detection for the IS–95 CDMA Forward Traffic Channel," Proc. IEEE Global Telecommunications Conf., 1789–1793 (1995).

* cited by examiner

Primary Examiner—Chi Pham
Assistant Examiner—Khanh Cong Tran
(74) Attorney, Agent, or Firm—Ryan, Mason & Lewis, LLP

(57) ABSTRACT

A method and apparatus are disclosed for determining the data rate of a received signal in a communication system utilizing code division multiple access (CDMA) techniques. The well-known Viterbi decoding-based rate detection approach is combined with the conventional repetition pattern-based rate detection approach. The hybrid approach possesses the advantages of both prior approaches, without their disadvantages. The computationally efficient repetition pattern-based data rate detection approach, while not as reliable as the Viterbi decoder-based data rate detection approach, provides reliable data rate detection most of the time. The repetition-pattern data rate detection approach is used as long as a predefined reliability metric is satisfied, and only uses the more computationally intensive Viterbi decoder-based data rate detection approach when detection reliability may be compromised. Under the hybrid rate detection scheme, a decision variable based on repetition patterns is initially formed and a decision is made on the data rate if the decision variable is in a reliable region. Otherwise, the Viterbi decoding-based rate detection scheme is employed.

16 Claims, 3 Drawing Sheets

METHOD AND APPARATUS FOR DETERMINING THE DATA RATE OF A RECEIVED SIGNAL IN A VARIABLE DATA RATE ORTHOGONAL SPREAD SPECTRUM COMMUNICATION SYSTEM

FIELD OF THE INVENTION

The present invention relates to cellular and other wireless communication systems, and more particularly, to methods and apparatus for determining the data rate in communication systems utilizing code division multiple access (CDMA) techniques.

BACKGROUND OF THE INVENTION

Code division multiple access (CDMA) techniques have been employed in many digital wireless communication systems to permit a large number of system users to communicate with one another. Current CDMA networks were designed to carry only voice traffic and exhibit limited data rate variability. CDMA networks, however, must evolve to encompass a variety of multimedia applications, each having potentially different data rates. Thus, CDMA networks will be required to carry information associated with the various multimedia applications at various data rates, corresponding to the requirements of diverse wireless services demanded by customers.

Many communication systems utilizing code division multiple access (CDMA) comply with the IS-95 standard, adopted by the Telecommunication Industry Association (TIA). Under the IS-95 standard, a communication system substantially eliminates co-channel interference and improves the bit energy-to-noise density ratio, $E_b/N_o$, on the forward link from a base station or cell site to a mobile receiver unit by modulating the information signals with Walsh orthogonal function sequences. To produce corresponding orthogonal information signals, these CDMA systems require that the forward link information signals be transmitted in a synchronized manner. A more detailed discussion of the IS-95 standard is provided in "Mobile Station-Base Station Compatibility Standard for Dual-Mode Wideband Spread Spectrum Cellular System," Telecommunication Industry Association Doc. No. TIA/EIA/IS-95 (1993), incorporated by reference herein.

Current implementations of the IS-95 standard allow a limited number of data rates. The Telecommunication Industry Association has recently adopted a new standard, IS-95B, for increasing the data rates that may be achieved with CDMA networks. The IS-95B standard permits data rates that are integer or power-of-two multiples of the basic CDMA rate. Thus, in one implementation, data rates (before error control coding) of 1,200 (1R), 2,400 (2R), 4,800 (4R) or 9,600 (8R) bits-per-second are available. In a second implementation, data rates (before error control coding) of 1,800 (1R), 3,600 (2R), 7,200 (4R) or 14,000 (8R) bits-per-second are available. All rates in a particular coding scheme come from only one rate set.

Typically, the higher data rates are utilized when there is intense voice activity. Thus, the highest data rates are utilized only when necessary, and the average data rates are reduced. The data rate changes frame by frame, with each speech frame being 20 milliseconds long. A mobile receiver, however, has no knowledge of what the data rate is for a given received frame. The IS-95 standard does not indicate the data rate of the transmitted signal. Thus, a mobile receiver has to detect the data rate before decoding the data, since decoding depends on the data rate. Accordingly, a need exists for a method and apparatus for determining the data rate of a received signal in a communication receiver utilizing code division multiple access (CDMA) techniques.

SUMMARY OF THE INVENTION

Generally, a method and apparatus are disclosed for determining the data rate of a received signal in a communication system utilizing code division multiple access (CDMA) techniques. The present invention combines the well-known Viterbi decoding-based rate detection approach with the conventional repetition pattern-based rate detection approach. The hybrid approach of the present invention possesses the advantages of both prior approaches, without their disadvantages.

The present invention recognizes that the computationally efficient repetition pattern-based data rate detection approach, while not as reliable as the Viterbi decoder-based data rate detection approach, provides reliable data rate detection most of the time. Thus, the present invention integrates the two prior art techniques, and utilizes the repetition-pattern data rate detection approach as long as a predefined reliability metric is satisfied, and only uses the more computationally intensive Viterbi decoder-based data rate detection approach when detection reliability may be compromised.

Under the hybrid rate detection scheme, a decision variable based on repetition patterns is initially formed and a decision is made on the data rate if the decision variable is in a reliable region. Otherwise, the Viterbi decoding-based rate detection scheme is employed. By properly establishing reliability thresholds, $T^H$ and $T^L$, for each possible data rate, the hybrid scheme has the same or better performance as a Viterbi decoding-based rate detection scheme, while also exhibiting the superior computational efficiency of a repetition pattern-based rate detection scheme (since the Viterbi rate detection is only performed when required).

If a decision variable, D, based on repetition patterns is less than a first reliability threshold, $T^L$, the data rate can reliably be said to be higher than the data rate associated with the decision variable. Thus, the hybrid scheme proceeds to evaluate the decision variable associated with the next highest data rate. Likewise, if the decision variable, D, is greater than a second reliability threshold, $T^H$, the data rate can reliably be said to be the data rate associated with the decision variable. Finally, if the decision variable, D, is not less than a first reliability threshold, $T^L$, and the decision variable, D, also is not greater than a second reliability threshold, $T^H$, then the Viterbi decoding-based rate detection scheme is employed to select a data rate from among the current data rate and all higher data rates.

A more complete understanding of the present invention, as well as further features and advantages of the present invention, will be obtained by reference to the following detailed description and drawings.

DETAILED DESCRIPTION

The present invention relates to a method and apparatus for determining the data rate of a received signal in a communication receiver utilizing code division multiple access (CDMA) techniques. As previously indicated, a mobile receiver has no knowledge of the data rate for a given received frame, and has to detect the data rate before decoding the data. Two conventional strategies for rate detection, Viterbi decoding-based rate detection schemes and repetition pattern-based rate detection algorithm, are discussed below. Thereafter, the present invention combines the Viterbi decoding-based rate detection approach with the repetition pattern-based rate detection approach. The present invention possesses the advantages of both approaches, without their disadvantages.

RATE DETECTION BY VITERBI DECODING

Figure 1:
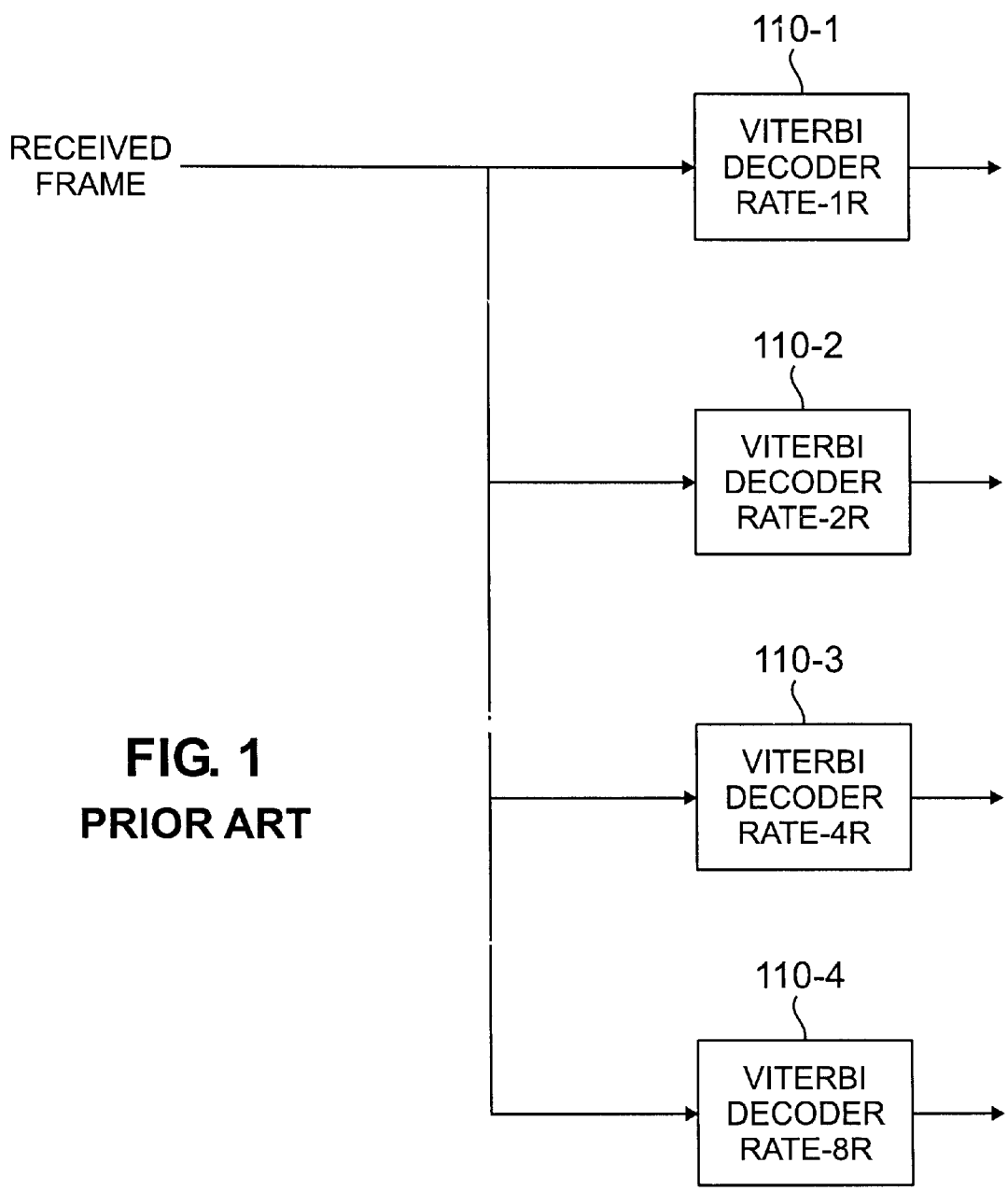
FIG. 1 illustrates a conventional Viterbi decoder-based rate detector in a receiver in a variable rate CDMA communication system.

FIG. 1 illustrates a conventional Viterbi decoder-based rate detector 100 in a receiver in a variable rate communication system utilizing code division multiple access (CDMA) techniques. As shown in FIG. 1, a received frame is processed along N-parallel branches, where N is equal to the number of available data rates. In the illustrative implementation, N is equal to four. Each of the N parallel branches is associated with a different data rate.

Along each parallel branch, the received frame is combined according to the repetition pattern of each data rate and is then decoded by a Viterbi decoder 110-N. The Viterbi decoder 110-N provides an output that measures how well the received frame and the decoded data are matched. For each of the parallel branches where the data rate is not correct, the received frame and the decoded data will match poorly. For the parallel branch corresponding to the correct data rate, however, there will be a very good match. Thus, the data rate is chosen to be the one associated with the best match.

The Viterbi decoder-based rate detector 100 has excellent detection performance. Under typical signal-to-noise ratios, the detection error rate is on the order of $10^{-5}$. Viterbi decoder-based rate detectors, however, require an excessive amount of computations. For example, an optimized Viterbi decoder-based rate detector program on a DSP-16000 digital signal processing core, takes 6 MIPS to decode at 9600 bits-per-second (with lower rates being reduced accordingly). Since the Viterbi decoder-based rate detector 100 has to test each rate hypothesis, the rate detection and decoding takes a total of 11.25 MIPS ((1+0.5+0.25+0.125)*6). It is noted that for an equal distribution of data rates, that are known a priori, the average number of MIPS for Viterbi decoding is only 2.81 ((1+0.5+0.25+0.125)*6/4). Thus, three quarters of the MIPS are spent on rate detection.

RATE DETECTION BY REPETITION PATTERNS

A conventional repetition pattern scheme employs one or more decision variables, D, to detect the data rate of a received frame. For example, $$D = |x_1 + x_2 + x_3 + x_4 + x_5 + x_6 + x_7 + x_8| \qquad \text{Eq. (1)}$$

where $x_i$ is the data in the received frame. At a rate of 1200 bits-per-second, for example, $x_1$ represent the same data bit, which is either 1 or −1. Thus, the sum of $x_1$ over the frame will add up to a large number. At a higher rate, such as 9600 bits-per-second, $x_1 \ldots x_8$, consists of multiple independent bits having values of 1 or −1. Thus, the sum of $x_1$ over the frame for the higher data rate will tend to cancel each other out and be a small number. This observation has been utilized to separate 1200 bps from other rates. Since each frame contains 384 bits, a decision variable, D, from all bits with proper normalization can be written as follows:

$$D_{1200} = \frac{\sum_{i=1}^{48} |x_{8i-7} + x_{8i-6} + x_{8i-5} + x_{8i-4} + x_{8i-3} + x_{8i-2} + x_{8i-1} + x_{8i}|}{\sum_{i=1}^{384} |x_i|} \qquad \text{Eq. (2)}$$

An alternate form of Equation (2), can be expressed as follows:

$$D_{1200} = \frac{\sum_{i=1}^{48} (x_{8i-7} + x_{8i-6} + x_{8i-5} + x_{8i-4})(x_{8i-3} + x_{8i-2} + x_{8i-1} + x_i)}{\sum_{i=1}^{384} x_i^2} \qquad \text{Eq. (3)}$$

It can be shown that the decision variable, $D_{1200}$, of Equation (3) has a positive mean at 1200 bits-per-second but a zero mean at higher rates. Thus, the decision variable, $D_{1200}$, can be used for separating received frames with a data rate of 1200 bits-per-second from the higher rates. Thus, a repetition pattern-based rate detection algorithm would evaluate the value of the decision variable, $D_{1200}$, and assign a data rate of 1200 bits-per-second if the decision variable, $D_{1200}$, exceeds a predefined threshold. If not, the repetition pattern-based rate detection algorithm will evaluate a decision variable for the next higher rate.

Two examples of decision variables for a rate of 2400 bits-per-second, $D_{2400}$, corresponding to equations (2) and (3), respectively, are as follows:

$$D_{2400} = \frac{\sum_{i=1}^{96} |x_{4i-3} + x_{4i-2} + x_{4i-1} + x_{4i}|}{\sum_{i=1}^{384} |x_i|} \qquad \text{Eq. (4)}$$

and $$D_{2400} = \frac{\sum_{i=1}^{96} (x_{4i-3} + x_{4i-2})(x_{4i-1} + x_{4i})}{\sum_{i=1}^{384} x_i^2} \qquad \text{Eq. (5)}$$

Thus, the decision variable, $D_{2400}$, can be used for separating received frames with a data rate of 2400 bits-per-second from the higher rates. Thus, a repetition pattern-based rate detection algorithm would evaluate the value of the decision variable, $D_{2400}$, and assign a data rate of 2400 bits-per-second if the decision variable, $D_{2400}$, exceeds a predefined threshold. If not, the repetition pattern-based rate detection algorithm will evaluate a decision variable for the next higher rate.

Two examples of decision variables for a rate of 4800 bits-per-second, $D_{4800}$, corresponding to equations (2) and (3), respectively, are as follows:

$$D_{4800} = \frac{\sum_{i=1}^{192} |x_{2i-1} + x_{2i}|}{\sum_{i=1}^{384} |x_i|} \quad \text{Eq. (6)}$$

and $$D_{4800} = \frac{\sum_{i=1}^{192} (x_{2i-1})(x_{2i})}{\sum_{i=1}^{384} x_i^2} \quad \text{Eq. (7)}$$

Thus, the decision variable, $D_{4800}$, can be used for separating received frames with a data rate of 4800 bits-per-second from the higher rates. Thus, a repetition pattern-based rate detection algorithm would evaluate the value of the decision variable, $D_{4800}$, and assign a data rate of 4800 bits-per-second if the decision variable, $D_{4800}$, exceeds a predefined threshold. If not, the repetition pattern-based rate detection algorithm will assume that the data has been transmitted at the highest rate (9600 bits-per-second).

The repetition pattern-based rate detection algorithm is computationally efficient. It only requires 0.1~0.2 MIPS on a DSP-16000 digital signal processing core. Thus, the overall computation for the rate detection and Viterbi decoding takes abouts 3 MIPS (2.81 MIPS for Viterbi decoding plus 0.2 MIPS for rate detection). However, the detection performance associated with repetition pattern-based rate detection algorithms is much poorer than Viterbi decoding-based rate detection schemes. Specifically, under typical signal-to-noise ratios, the detection error rate for a repetition pattern-based rate detection algorithm is on the order of $10^{-2}$~$10^{-3}$. Since a frame is in error when the rate detection is incorrect, rate detection errors contribute significantly to the frame error rate.

For a more detailed discussion of repetition pattern-based rate detection algorithms, see, for example, Sheung Chi Ng et al., "Rate Determination Algorithms in IS-95 Forward Traffic Channels," Proc. of the Vehicular Traffic Conference (VTC) '98, Ottawa, Canada (May, 1998), incorporated by reference herein.

HYBRID RATE DETECTION SCHEME

Figure 2:
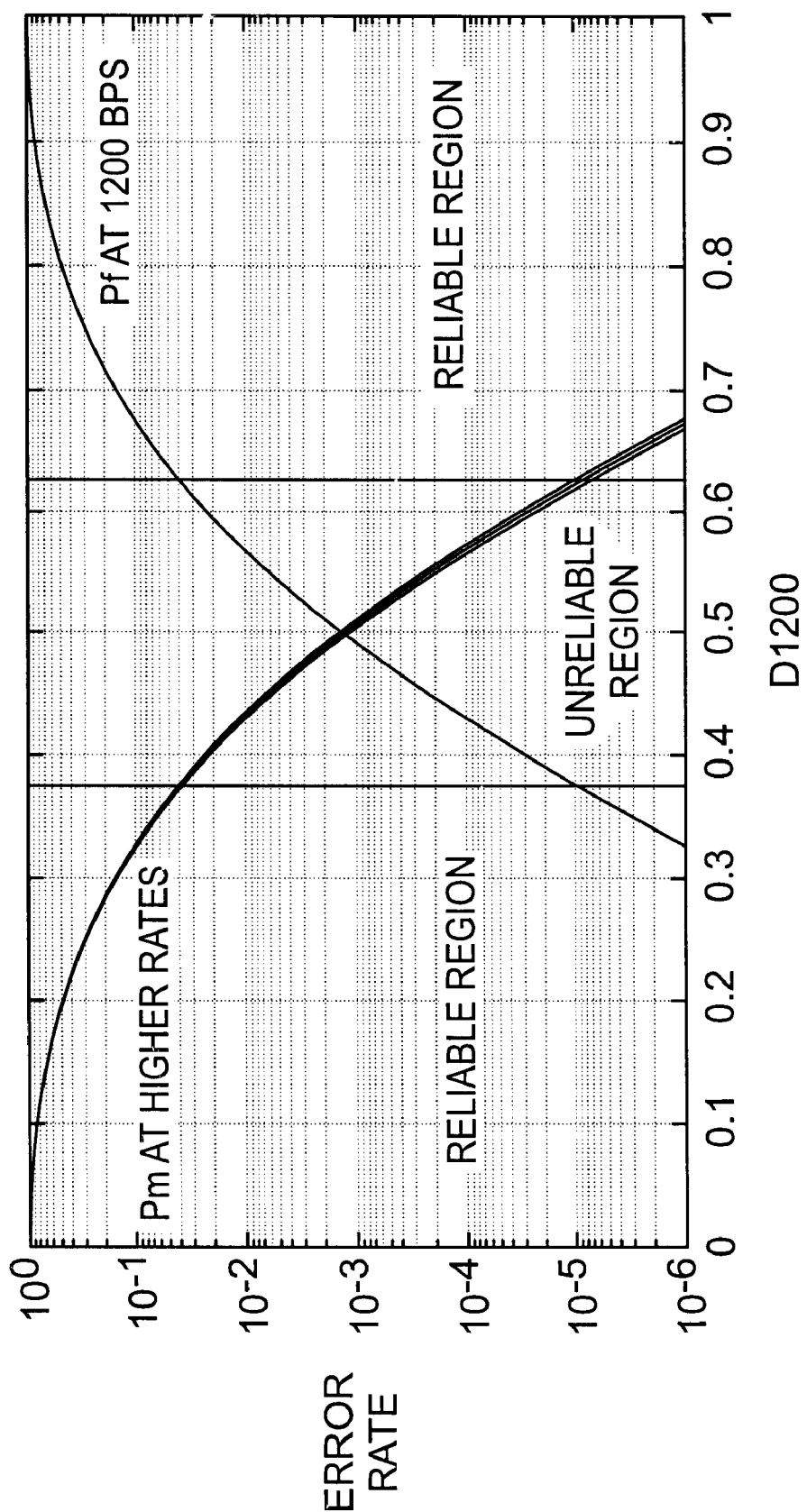
FIG. 2 illustrates the reliability of the conventional repetition-pattern approach, and indicates regions where the Viterbi-decoder approach is employed to improve reliability in accordance with the present invention.

The present invention recognizes that the repetition-pattern approach, while not as reliable as the Viterbi-decoder approach, still provides reliable data rate detection most of the time, as shown in FIG. 2. As shown in FIG. 2, the detection performance of a rate detector can be characterized by two probability distributions. The two probability distributions are defined as follows, when the decision variable, $D_{1200}$, is considered. First, the probability of a miss, $P_m$, is the probability that the detector decides the data rate is higher than 1200 bits-per-second while the true data rate is 1200 bits-per-second. Second, the probability of a false alarm, $P_f$, is the probability that the detector decides the data rate is 1200 bits-per-second while the true data rate is higher. The probabilities, $P_m$ and $P_f$, are shown in FIG. 2.

If the region in FIG. 2 where both probabilities, $P_m$ and $P_f$, are below $10^{-5}$, are defined as the reliable regions (comparable to the performance of the Viterbi decoder-based rate detection), then the following can be observed:
(1) at a rate of 1200 bits-per-second, or at higher rates, the decision variable, $D_{1200}$, falls out of the reliable regions at a probability of 0.04. It is noted that the probability numbers may vary with exact form of the decision variable utilized, and with the signal-to-noise ratio (SNR). Nonetheless, the decision variable falls within the reliable region most of the time.
(2) the reliable regions can be defined as two thresholds: $T_{1200}^H$ and $T_{1200}^L$. If $D_{1200}$ is less than $T_{1200}^L$ the data rate can reliably be said to be higher than 1200 bits-per-second. Likewise, if $D_{1200}$ is greater than $T_{1200}^H$ the data rate can reliably be said to be 1200 bits-per-second.

Similar curves can be obtained at rates higher than 1200 bits-per-second, although at higher rates the decision variable will be even more likely to fall in the reliable region. The decision variable is more reliable at higher rates, since the signal energy is also higher.

According to a feature of the present invention, a hybrid rate detection scheme is utilized. Initially, a decision variable based on repetition patterns is formed and a decision is made on the data rate if the decision variable is in the reliable region. Otherwise, a Viterbi decoding-based rate detection scheme is employed. By properly establishing the thresholds, $T^H$ and $T^L$, for each possible rate, for the reliable regions, the hybrid scheme has the same or better performance as a Viterbi decoding-based rate detection scheme, while also exhibiting the superior computational efficiency of a repetition pattern-based rate detection scheme (since the Viterbi rate detection is only performed when required).

Figure 3:
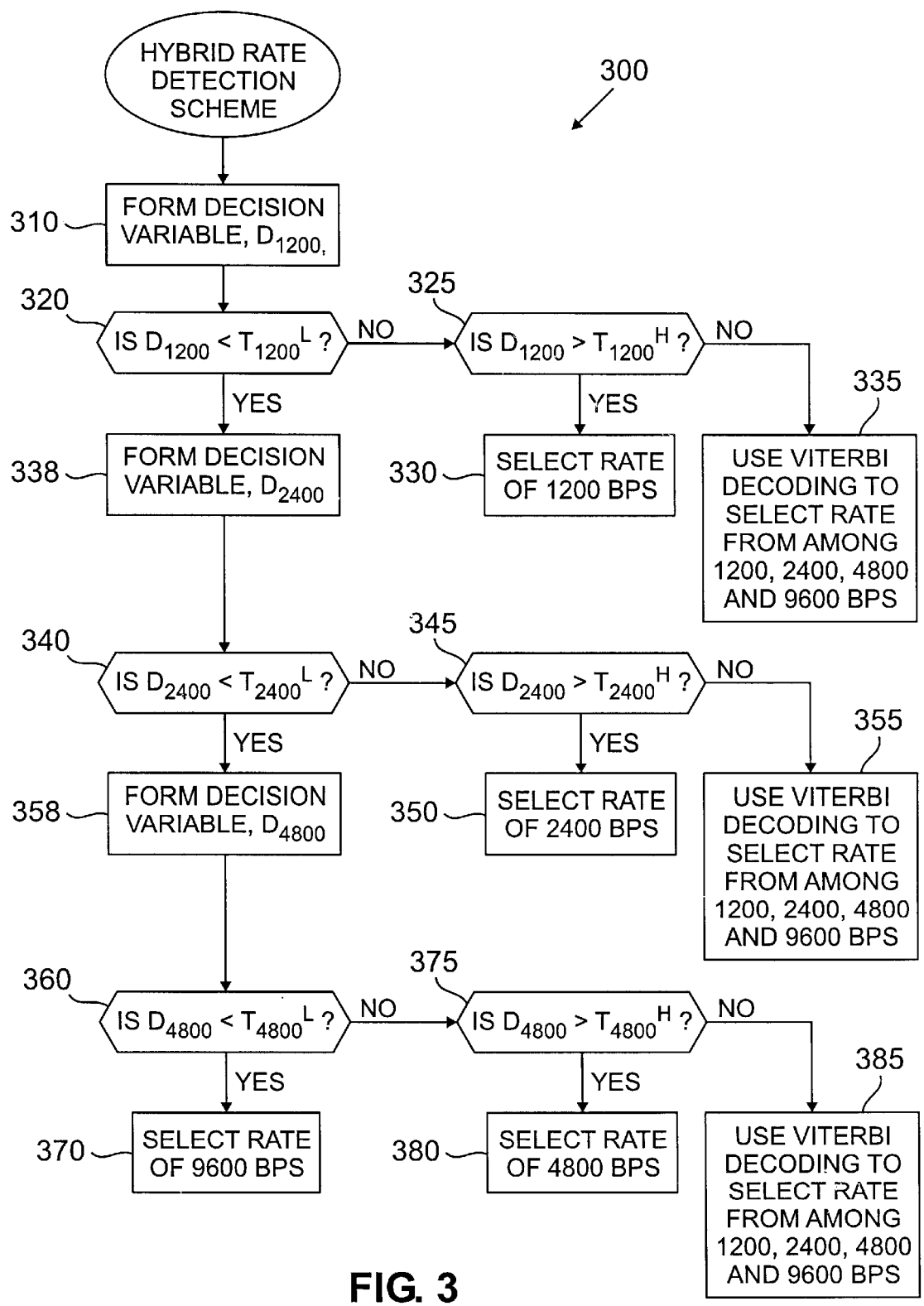
FIG. 3 is a flow chart describing an exemplary hybrid rate detection scheme that may be employed by a CDMA receiver in accordance with the present invention.

FIG. 3 is a flow chart, illustrating a hybrid rate detection scheme 300 in accordance with the present invention. As shown in FIG. 3, the decision variable, $D_{1200}$, is formed during step 310. Thereafter, a test is performed during step 320 to determine if the decision variable, $D_{1200}$, is less than the threshold, $T_{1200}^L$. If it is determined during step 320 that the decision variable, $D_{1200}$, is less than the threshold, $T_{1200}^L$, then the data rate must be higher than 1200 bits-per-second, and program control proceeds to step 338.

If, however, it is determined during step 320 that the decision variable, $D_{1200}$, is not less than the threshold, $T_{1200}^L$, then a further test is performed during step 325 to determine if the decision variable, $D_{1200}$, is greater than the threshold, $T_{1200}^H$. If it is determined during step 325 that the decision variable, $D_{1200}$, is greater than the threshold, $T_{1200}^H$, then a data rate of 1200 bits-per-second is selected for the current frame during step 330 and program control stops.

If, however, it is determined during step 325 that the decision variable, $D_{1200}$, is not greater than the threshold, $T_{1200}^H$, then Viterbi decoding-based rate detection techniques are employed during step 335 to select a data rate from among the possible rates of 1200, 2400, 4800 and 9600 bits-per-second, before program control terminates.

If it is determined during step 320 that the decision variable, $D_{1200}$, is less than the threshold, $T_{1200}^L$, then the data rate must be higher than 1200 bits-per-second, and program control proceeds to step 338. The decision variable, $D_{2400}$, is formed during step 338. Thereafter, a test is performed during step 340 to determine if the decision variable, $D_{2400}$, is less than the threshold, $T_{2400}^L$. If it is determined during step 340 that the decision variable, $D_{2400}$, is less than the threshold, $T_{2400}^L$, then the data rate must be higher than 2400 bits-per-second, and program control proceeds to step 358.

If, however, it is determined during step 340 that the decision variable, $D_{2400}$, is not less than the threshold, $T_{2400}^L$, then a further test is performed during step 345 to determine if the decision variable, $D_{2400}$, is greater than the threshold, $T_{2400}^H$. If it is determined during step 345 that the decision variable, $D_{2400}$, is greater than the threshold, $T_{2400}^H$, then a data rate of 2400 bits-per-second is selected for the current frame during step 350 and program control stops.

If, however, it is determined during step 345 that the decision variable, $D_{2400}$, is not greater than the threshold, $T_{2400}^H$, then Viterbi decoding-based rate detection techniques are employed during step 355 to select a data rate from among the possible rates of 1200, 2400, 4800 and 9600 bits-per-second, before program control terminates.

If it is determined during step 340 that the decision variable, $D_{2400}$, is less than the threshold, $T_{2400}^L$, then the data rate must be higher than 2400 bits-per-second, and program control proceeds to step 358. The decision variable, $D_{4800}$, is formed during step 358. Thereafter, a test is performed during step 360 to determine if the decision variable, $D_{2400}$, is less than the threshold, $T_{4800}^L$. If it is determined during step 360 that the decision variable, $D_{4800}$, is less than the threshold, $T_{4800}^L$, then the data rate must be higher than 4800 bits-per-second, and a data rate of 9600 bits-per-second is selected for the current frame during step 370.

If, however, it is determined during step 360 that the decision variable, $D_{4800}$, is not less than the threshold, $T_{4800}^L$, then a further test is performed during step 375 to determine if the decision variable, $D_{4800}$, is greater than the threshold, $T_{4800}^H$. If it is determined during step 375 that the decision variable, $D_{4800}$, is greater than the threshold, $T_{4800}^H$, then a data rate of 4800 bits-per-second is selected for the current frame during step 380 and program control stops.

If, however, it is determined during step 375 that the decision variable, $D_{4800}$, is not greater than the threshold, $T_{4800}^H$, then Viterbi decoding-based rate detection techniques are employed during step 385 to select a data rate from among the possible rates of 1200, 2400, 4800 and 9600 bits-per-second, before program control terminates.

It is to be understood that the embodiments and variations shown and described herein are merely illustrative of the principles of this invention and that various modifications may be implemented by those skilled in the art without departing from the scope and spirit of the invention.

We claim:

1. A method for detecting a data rate in a received spread spectrum signal, comprising the steps of:
   detecting said data rate using a repetition-pattern data rate detection approach if a predefined reliability metric is satisfied; and
   detecting said data rate using a Viterbi decoder-based data rate detection approach when said predefined reliability metric is not satisfied, wherein said predefined reliability metric ensures that a decision variable based on a repetition pattern is in a reliable region.

2. The method according to claim 1, wherein said predefined reliability metric is based on reliability thresholds, $T^H$ and $T^L$, for each possible data rate.

3. The method according to claim 1, wherein the reliability thresholds, $T^H$ and $T^L$, are selected based on a decision variable based on a repetition pattern.

4. The method according to claim 1, wherein said Viterbi decoder-based data rate detection selects a data rate from each possible data rate.

5. A method for detecting the data rate in a received spread spectrum signal, comprising the steps of:
   forming a decision variable based on a repetition pattern;
   determining said data rate using said decision variable if said decision variable is in a reliable region; and
   determining said data rate using a Viterbi decoder-based data rate detection approach if said decision variable is outside a reliable region.

6. The method according to claim 5, wherein said reliable region is established by reliability thresholds, $T^H$ and $T^L$, for each possible data rate.

7. The method according to claim 5, wherein the reliability thresholds, $T^H$ and $T^L$, are selected based on the particular decision variables evaluated.

8. The method according to claim 5, wherein said Viterbi decoder-based data rate.

9. A method for detecting a data rate in a received spread spectrum signal, comprising the steps of:
   selecting a data rate associated with a decision variable if said decision variable is greater than a first reliability threshold, $T^H$;
   evaluating a decision variable associated with a next highest data rate if said decision variable is less than a second reliability threshold, $T^L$;
   selecting said data rate using a Viterbi decoder-based data rate detection approach if said decision variable is not greater than said first reliability threshold, $T^H$, and is also not less than said second reliability threshold, $T^L$; and
   repeating said steps for a decision variable associated with the next highest data rate until a data rate is selected.

10. The method according to claim 9, wherein the reliability thresholds, $T^H$ and $T^L$, are selected based on the particular decision variables evaluated.

11. The method according to claim 9, wherein said Viterbi decoder-based data rate detection selects a data rate from each possible data rate.

12. A data rate detector for use in a CDMA system, comprising:
   a memory for storing computer-readable code; and
      a processor operatively coupled to said memory, said processor configured to:
      detect said data rate using a repetition-pattern data rate detection approach if a predefined reliability metric is satisfied; and
      detect said data rate using a Viterbi decoder-based data rate detection approach when said predefined reliability metric is not satisfied, wherein said predefined reliability metric ensures that a decision variable based on a repetition pattern is in a reliable region.

13. A data rate detector for use in a CDMA system, comprising:
   a memory for storing computer-readable code; and
   a processor operatively coupled to said memory, said processor configured to:
   form a decision variable based on a repetition pattern;
   determine said data rate using said decision variable if said decision variable is in a reliable region; and
   determine said data rate using a Viterbi decoder-based data rate detection approach if said decision variable is outside a reliable region.

14. A data rate detector for use in a CDMA system, comprising:
   a memory for storing computer-readable code; and
      a processor operatively coupled to said memory, said processor configured to:
      select a data rate associated with a decision variable if said decision variable is greater than a first reliability threshold, $T^H$;

evaluate a decision variable associated with a next highest data rate if said decision variable is less than a second reliability threshold, $T^L$;

select said data rate using a Viterbi decoder-based data rate detection approach if said decision variable is not greater than said first reliability threshold, $T^H$, and is also not less than said second reliability threshold, $T^L$; and repeat said steps for a decision variable associated with the next highest data rate until a data rate is selected.

15. A data rate detector for use in a CDMA system, comprising:

means for detecting said data rate using a repetition-pattern data rate detection approach if a predefined reliability metric is satisfied; and means for detecting said data rate using a Viterbi decoder-based data rate detection approach when said predefined reliability metric is not satisfied, wherein said predefined reliability metric ensures that a decision variable based on a repetition pattern is in a reliable region.

16. A data rate detector for use in a CDMA system, comprising:

means for forming a decision variable based on a repetition pattern;

means for determining said data rate using said decision variable if said decision variable is in a reliable region; and means for determining said data rate using a Viterbi decoder-based data rate detection approach if said decision variable is outside a reliable region.

* * * * *

UNITED STATES PATENT AND TRADEMARK OFFICE
CERTIFICATE OF CORRECTION

PATENT NO. : 6,567,466 B1  Page 1 of 1
DATED : May 20, 2003
INVENTOR(S) : Ovalekar et al.

It is certified that error appears in the above-identified patent and that said Letters Patent is hereby corrected as shown below:

Column 8,
Line 11, after "rate" insert -- detection selects a data rate from each possible data rate --.

Signed and Sealed this

Twenty-seventh Day of December, 2005

JON W. DUDAS
*Director of the United States Patent and Trademark Office*